Nov. 15, 1927.
E. GEBHART
1,649,681
AGRICULTURAL IMPLEMENT
Filed Feb. 6, 1926
3 Sheets-Sheet 1
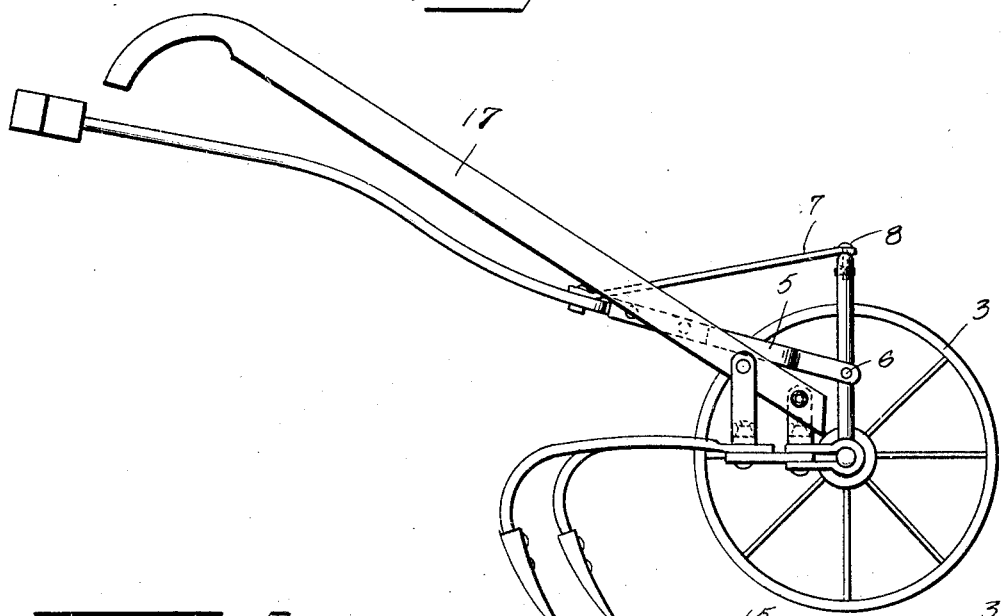
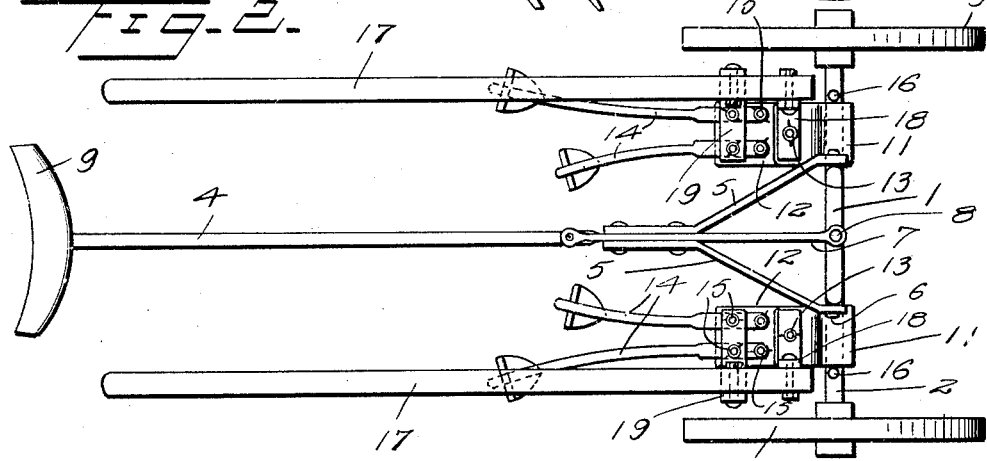
Inventor
E. Gebhart

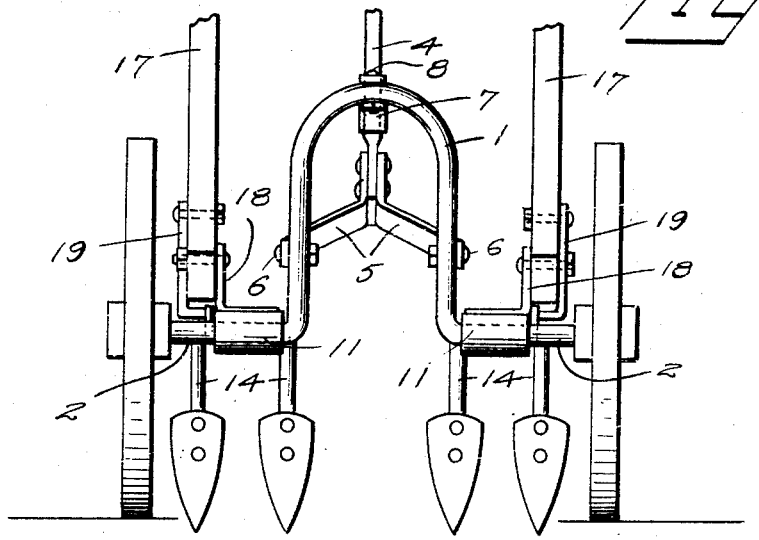
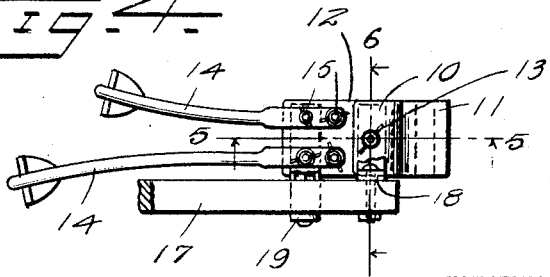
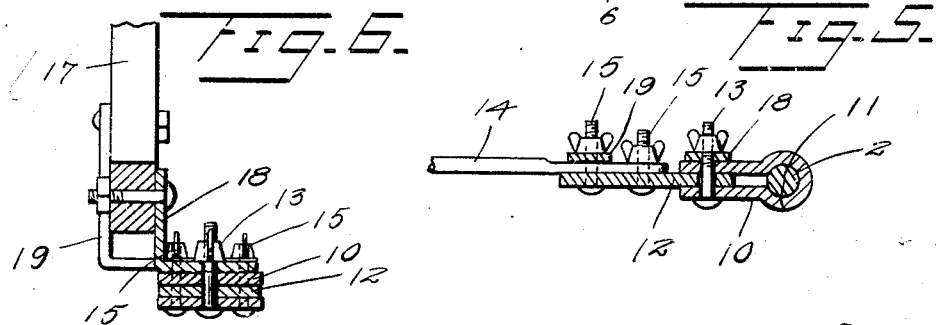

Nov. 15, 1927.
E. GEBHART
1,649,681
AGRICULTURAL IMPLEMENT
Filed Feb. 6, 1926
3 Sheets-Sheet 3
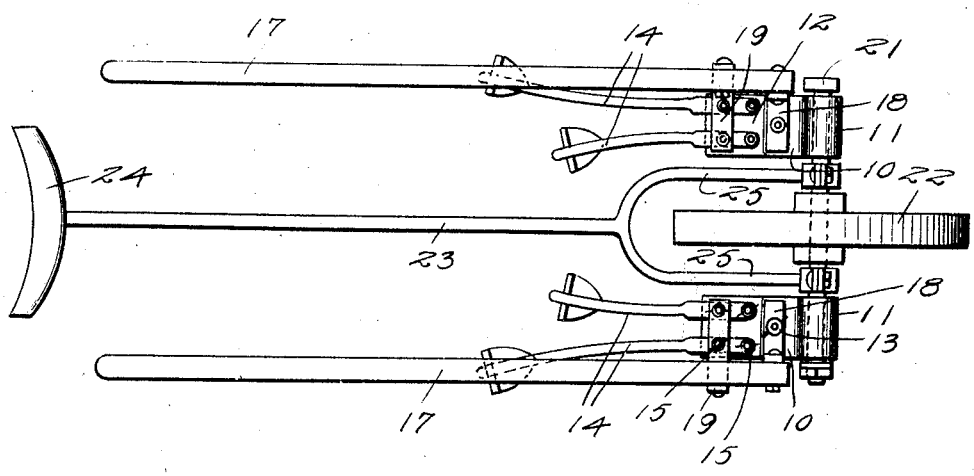
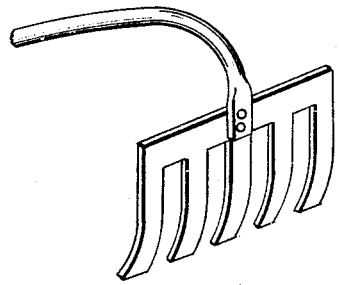
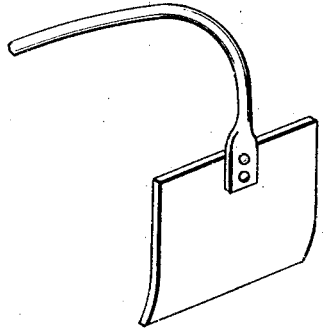
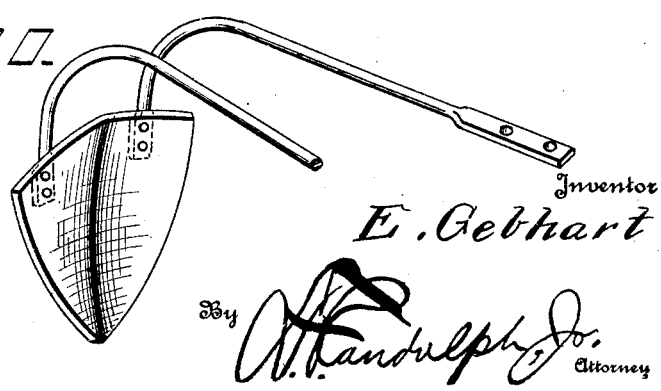

Patented Nov. 15, 1927.

1,649,681

UNITED STATES PATENT OFFICE.

EDWIN GEBHART, OF BELLWOOD, PENNSYLVANIA.

AGRICULTURAL IMPLEMENT.

Application filed February 6, 1926. Serial No. 86,496.

The invention relates to agricultural implements of the type operated by man power in which the ground working implements are carried by wheels and has for its object the provision of a machine of this type in which the ground working devices are so mounted on the wheeled axle that they may be independently raised and lowered and moved from side to side under the guidance of the operator, the machine being provided with means for actuating it so as to leave the hands and arms of the operator free to guide the ground working devices, the actuating means comprising a push rod secured to the axle and having a yoke to be engaged by the body of the operator.

The invention also includes means for securing the ground working devices to the machine so that they may be removed and replaced to adapt the machine to use with tools of different natures, such for instance as cultivator blades, plow points, rakes and scrapers. Provision is also made by which the ground working devices may be supported on a two wheeled structure or on a structure involving but a single wheel.

The construction and operation and advantages of the invention herein will be clearly described hereinafter and will be found illustrated in the accompanying drawings, in which Figure 1 is a side view of the improved implement, Figure 2 a top plan view, Figure 3 a front view, Figure 4 a detail view on an enlarged scale of one of the ground working units, Figure 5 a sectional view on a plane indicated by the line 5—5 of Figure 4, Figure 6 is a similar view on the line indicated by the line 6—6 of Figure 4, Figure 7, a top plan view showing the adaptation of the machine to use with a single wheel, and Figures 8, 9, and 10 views of fragments of ground working devices for use with the implement.

In the drawings similar reference characters are used to designate corresponding parts throughout the several views.

The type of device as shown in Figures 1, 2, and 3 is adapted for use when the plants being treated are small and it is desired to straddle the rows of plants, and in this construction of the device an arch-shaped axle 1 is provided having the lower ends of the legs of the arch extended laterally as shown at 2 and having the ground wheels 3 journaled thereon. A push rod 4 is provided to actuate the machine and is connected with the arch-shaped axle 1 by means of forked arms 5 secured by bolts or other suitable fastenings 6 to the legs of the arch, and having a rod 7 connecting the top side of the rod 4 and the bow of the arch to which it is secured by means of a bolt or other suitable fastening 8. 9 indicates a yoke or cross head at the free end of the push rod 4 that engages the body of the operator when the instrument is in use.

By employing the push rod 4 as above described, the hands of the operator are left free to direct the operation of the ground working devices, and on each side of the arch 1 is journaled a bracket 10 having an integral sleeve that engages the axle and is rotatably mounted thereon, said integral sleeve being designated 11. A plate 12 is pivotally secured to each bracket 10 by means of a pivot pin or bolt 13, and said plate is provided with a plurality of openings to secure the stock of the ground working device thereto, said stock being designated 14, wing nuts 15 and bolts being preferably employed to secure said stocks 14 to the plate 12 so that they may be readily removed when it is desired to change the nature of the implement. The nut on pin or bolt 13 should also be of the wing type for easy removal and replacement.

One of the brackets 10 and the other parts hereinbefore described as connected therewith is mounted on each side of the arch 1 on the lateral extension 2 and is maintained from sliding longitudinally of the extension 2 by means of a pin or bolt 16 engaged through the extension 2.

A handle 17 is connected with each of the brackets 10 and plates 12 by means of two L-shaped clips 18 and 19. The L-shaped clip 18 is engaged with the pin 13, while the foot piece of the L-shaped member 19 is engaged with two of the bolts under wing nuts 15 that are used to secure the stocks 14 to the plate 12.

It will be readily understood from this description and reference to the drawings, that the operator can control the depth of cut of the ground working device on the stock 14 by raising and lowering the handle 17, the sleeve 11 rotating on the lateral extension 2 permitting this action, and may at the same time move the ground working devices from side to side as he may find it necessary, the pivotal connection at 13 between the plate 12 and bracket 10 permitting this operation. It will be readily appreciated that because of this adjustability of the ground working devices, and the fact that this adjustability is independently accomplished on both sides of the arch 1, a most efficient working of the soil may be accomplished.

In Figure 7 is shown adaptation of the invention to use with an implement employing but one ground wheel, and in the view of the device in Figure 7 the axle is designated 21 and is as shown of the straight type and carrying a wheel 22 that is rotatably mounted thereon, the implement being pushed by a push rod 23 having the yoke 24 and the forked arms 25 secured to the axle at opposite sides of the wheel 22. The ground working devices and their mounting are identical in structure with the ground working devices and their mountings heretofore described in connection with Figures 1, 2, and 3, and in fact are interchangeable, that is, being adapted to be removed from the lateral extension 2 and mounted on the axle 21 in the position shown in Figure 7 and the same characters will therefore be found to be used for the ground working devices in Figure 7 as has heretofore been used in connection with Figures 1, 2, and 3.

In Figures 8, 9, and 10 are shown implements other than the cultivator blades selected for illustration in connection with Figures 1, 2, and 3, Figure 8 being a cultivator blade of a multiple prong type and which might be called a rake type, Figure 9 a scraper blade, and Figure 10, a plow blade, it being noted that in Figure 10 there are two stocks, this implement being attached to the two plates on opposite sides of the arch as in Figures 1, 2, and 3, or of the wheel 22 as in Figure 7, but preferably used in connection with the two wheel structure.

What is claimed is:—

1. In an agricultural implement of the walking type, an axle, wheels journaled on said axle, means to actuate the axle, a bracket member rotatably mounted on said axle, a plate pivotally engaging said bracket and adapted to be attached to ground working devices, a pivot for said bracket and plate, a handle engaging said pivot, and means to secure said handle to the plate for simultaneous movement therewith.

2. In an agricultural implement of the walking type, an arched axle, the legs of said arched axle laterally extended, wheels journaled on said lateral extension, ground working devices adjustably mounted on said lateral extension, handles operatively connected with said ground working devices, a push rod having a yoke to be engaged by the operator, arms connecting said push rod and the legs of the arched axle, and a bar connecting the push rod and the bow of the arched axle.

3. In an agricultural implement of the walking type, an axle, a bracket rotatably engaging the axle, a plate pivotally engaging the bracket to swing laterally thereof and adapted to be secured to ground working implements, a pivot pin for the bracket and plate, an L-shaped clip pivotally engaging said pin, another L-shaped clip secured to the plate, and a handle secured to said clips.

In testimony whereof I affix my signature.

EDWIN GEBHART.